US012630210B2

(12) United States Patent (10) Patent No.: US 12,630,210 B2
Schwenke et al. (45) Date of Patent: May 19, 2026

(54) ACTUATOR OF A STEER-BY-WIRE STEERING DEVICE OF A MOTOR VEHICLE AND METHOD FOR ASSEMBLING AN ACTUATOR OF A STEER-BY-WIRE STEERING DEVICE

(71) Applicant: ZF Friedrichshafen AG, Friedrichshafen (DE)

(72) Inventors: Henning Schwenke, Westerkappeln (DE); Vitali Wiebe, Ostbevern (DE); Gerrit Seevers, Wetschen (DE); Thomas Reichel, Westerkappeln (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 622 days.

(21) Appl. No.: 18/002,868

(22) PCT Filed: Jun. 23, 2021

(86) PCT No.: PCT/EP2021/067100
§ 371 (c)(1),
(2) Date: Dec. 22, 2022

(87) PCT Pub. No.: WO2022/008243
PCT Pub. Date: Jan. 13, 2022

(65) Prior Publication Data
US 2023/0331289 A1 Oct. 19, 2023

(30) Foreign Application Priority Data
Jul. 7, 2020 (DE) ..................... 10 2020 208 514.5

(51) Int. Cl.
B62D 5/00 (2006.01)
B62D 5/04 (2006.01)
(Continued)

(52) U.S. Cl.
CPC ........... B62D 5/001 (2013.01); B62D 5/0445 (2013.01); B62D 7/228 (2013.01); F16H 25/20 (2013.01);
(Continued)

(58) Field of Classification Search
CPC ...... B62D 5/001; B62D 5/0445; B62D 7/228; B62D 5/0418; F16H 25/20;
(Continued)

(56) References Cited

U.S. PATENT DOCUMENTS

| 5,379,660 | A | 1/1995 | Ishikawa |
| 9,248,718 | B2 | 2/2016 | Kuhnt |
| 10,871,211 | B2 | 12/2020 | Kuster et al. |

FOREIGN PATENT DOCUMENTS

| DE | 10 2012 019 228 A1 | 4/2014 |
| DE | 10 2014 205 934 A1 | 10/2015 |

(Continued)

OTHER PUBLICATIONS

Sleeve journal bearings ("Pennacchi") (Year: 2017).*

(Continued)

*Primary Examiner* — Jason D Shanske
*Assistant Examiner* — Al-Birr Rahman Chowdhury
(74) *Attorney, Agent, or Firm* — Secant IP, PLLC

(57) ABSTRACT

An actuator (10) of a steer-by-wire steering device of a motor vehicle comprises a housing (46, 146), a spindle (42, 142) and a positionally fixed spindle nut (43, 143) mounted so that it can rotate, which within the housing (46, 146) form a spindle drive (41, 141) for the axial displacement of the spindle (42, 142) relative to the spindle nut. An inertial mass (100, 300, 400, 400a, 500, 600) is at least indirectly coupled to the spindle (142), taking into account the oscillation behavior of at least one component of the actuator (10), in particular the spindle (142).

13 Claims, 7 Drawing Sheets

(51) Int. Cl.
B62D 7/22 (2006.01)
F16H 25/20 (2006.01)

(52) U.S. Cl.
CPC ................ *F16H 2025/2031* (2013.01); *F16H 2025/2081* (2013.01); *F16H 2025/2096* (2013.01)

(58) Field of Classification Search
CPC ..... F16H 2025/2031; F16H 2025/2081; F16H 2025/2096; F16F 15/30
See application file for complete search history.

(56) References Cited

FOREIGN PATENT DOCUMENTS

| | | | |
|---|---|---|---|
| DE | 102015206455 A1 * | 9/2016 | ............ F16H 25/20 |
| DE | 10 2018 208 200 A1 | 11/2019 | |
| GB | 1077102 | 7/1967 | |
| JP | H07-293 659 A | 11/1995 | |

OTHER PUBLICATIONS

DE-102012019228-A1 Espace Translation (Year: 2014).*
DE-102015206455-A1 Espace Translation (Year: 2016).*
German Patent Office, German Search Report issued in German patent application No. 10 2020 208 514.5 (Mar. 27, 2024).
European Patent Office, International Search Report issued for International patent application No. PCT/EP2021/067100 (Oct. 1, 2021).
European Patent Office, Written Opinion issued for International patent application No. PCT/EP2021/067100 (Oct. 1, 2021).

* cited by examiner

ACTUATOR OF A STEER-BY-WIRE STEERING DEVICE OF A MOTOR VEHICLE AND METHOD FOR ASSEMBLING AN ACTUATOR OF A STEER-BY-WIRE STEERING DEVICE

RELATED APPLICATIONS

This application claims the benefit under 35 U.S.C. § 371 as a U.S. National Phase application of application no. PCT/EP2021/067100, filed on 23 Jun. 2021, which claims benefit of German Patent Application no. 10 2020 208 514.5 filed 7 Jul. 2020, the contents of which are hereby incorporated herein by reference in their entireties.

FIELD OF THE DISCLOSURE

The invention relates to an actuator of a steer-by-wire steering device of a motor vehicle and to a method for assembling an actuator, according to the present disclosure.

BACKGROUND

From DE 10 2014 205 934 A1 a servomotor or actuator with a positionally fixed spindle nut and a spindle which can be displaced axially relative to the spindle nut, are known. At least one end of an actuator of that type, which finds application in a steer-by-wire steering device, is connected to a wheel carrier by means of a steering linkage. Thus, by virtue of the linear displacement of the spindle a change of the wheel steering angle of a wheel mounted to rotate on the wheel carrier can take place. The steer-by-wire steering device, which operates independently of a steering manipulator such as a steering-wheel, is controlled by way of a signal path. i.e. without any mechanical coupling. The movement thread is in the form, for example, of a trapezium thread, which is self-locking.

In a chassis of a motor vehicle large lateral forces occur, which have to be supported by the aforesaid actuator for the steering device to be able to guide the wheels. In the movement thread of the spindle drive of the actuator the large forces bring about severe wear. Between the thread flanks of the spindle and the spindle nut, severe wear takes place even when optimized lubricants are used. Owing to the static friction and sliding friction occurring between the thread partners at the contact surfaces of the thread flanks in contact with one another, a so-called stick-slip effect may occur. This is an alternation between sticking and sliding of the thread flanks which, for one, can result in fluctuating torques between the spindle nut and the spindle. For example, the spindle can be excited into rotational oscillations. Continual or temporary excitation over a minimum time period can result in a resonance frequency of the spindle or other components in the actuator being reached. Then, under adverse circumstances the excitation can emit air-borne noise to the extent that it can be perceived by occupants of the vehicle.

In the aforesaid spindle drive the stick-slip effect can give rise to rotational oscillations, also called torque fluctuations. In contrast to translational oscillations, in the case of rotational oscillations the oscillations take place about the rotational degree of freedom of a system. In both cases the oscillations are mechanical.

SUMMARY

A purpose of the present invention is to develop further an actuator of a steer-by-wire steering device of a motor vehicle in such manner that the actuator is acoustically unobtrusive, so that as little air-borne noise as possible is emitted.

This problem is solved by an actuator of a steer-by-wire steering device of a motor vehicle according to the present disclosure. Preferred further developments are indicated in the claims and disclosed herein.

An actuator of a steer-by-wire steering device of a motor vehicle comprises a housing in which a spindle and a rotatable but positionally fixed spindle nut are fitted. Within the housing the spindle and the spindle nut form a spindle drive for displacing the spindle relative to the spindle nut. For that purpose, the spindle has an external thread, which meshes with the internal thread of the spindle nut. When the spindle nut is driven in rotation, for example by an electric motor, preferably indirectly by way of a transmission, preferably a belt transmission, the movement thread brings about a displacement of the spindle, axially along its longitudinal axis, relative to the spindle nut and the housing. By virtue of the axial displacement of the spindle along its longitudinal axis the wheel steering angle of a wheel mounted to rotate on a wheel carrier connected at least to one end of the spindle can be changed.

To reduce, or in the most favorable case eliminate, the previously explained audible oscillations of individual components of the actuator, an inertial mass is coupled at least indirectly to the spindle. In such a case the inertial mass is designed by taking into account the oscillation behavior of at least one component of the actuator, preferably the spindle. As described earlier, the large lateral forces of the wheels bring about a high surface pressure between the thread flanks in the movement thread. Thereby torque fluctuations are produced, so that the stick-slip effect is reinforced when the rotary drive drives the spindle nut temporarily or at intervals. Here it should be borne in mind that during the normal operation of a steering device, for the most part, only slight wheel steering angle changes take place. These slight changes can be produced by small rotation movements of the spindle nut. Thus, during normal operation of the actuator, continual changes between a static and a rotating spindle nut can give rise to the excitation of oscillations, particularly in the spindle component. Especially when parking, the wheels rotate only at low speeds so that particularly large forces act upon the spindle. But other components too can be excited into oscillations in that way, particularly if they have a resonance frequency similar to that of the spindle.

The term "stick-slip effect" derives from the two English words "stick" (adhere) and "slip" (slide). In physics and technology, the stick-slip effect describes an almost always undesired jerky slipping (stop-slip-stop-slip) of solid bodies moving relative to one another. In the case of the spindle, a rotational oscillation is caused by the spindle nut, whereas the spindle itself does not rotate.

To change the oscillation behavior of the spindle, it could be made with a larger mass, for example a larger diameter. Although this would indeed change its resonance frequency, it would entail greater use of material with increased weight and the need for additional mechanical processing, for example in the form of machining during its manufacture, as a result of which the spindle would be more expensive. If the diameter of the spindle were increased, this would also require larger bearings for it in the housing and the dimensions of the spindle nut would also have to be adapted. Furthermore, problems could be encountered in the assembly of the spindle.

Advantageously, by virtue of the present invention a steer-by-wire steering device can be created without substantially modifying an existing actuator, by means of an inertial mass which changes the oscillation behavior. Owing to its mass moment of inertia the inertial mass has a damping effect on the spindle when the inertial mass is coupled to the spindle. In other words, owing to its mass moment of inertia the inertial mass acts upon the spindle in such manner that the excitation due to the stick-slip effect is not sufficient to emit air-borne noise.

The inertial mass is preferably a separate component. It is designed, as a function of its mass moment of inertia, depending on the oscillation behavior of the component that can emit air-borne noise, most likely the spindle. For example, the oscillation behavior and thus the resonance frequency of the spindle is known, so that the inertial mass can be designed as a function of the known parameters.

Preferably, the inertial mass is formed by a single component, or with a plurality of parts. For simpler assembly, a supporting component can first be coupled or connected to the spindle. In its dimensions the supporting component is designed such that it does not impede the assembly of the spindle with bearings or with the housing of the actuator. Thereafter, the supporting component can be supplemented with a mass component such that the pre-calculated inertial mass is obtained. In such a case the supporting component can be the same for different actuators, so that depending on the amount of damping required only a different mass component has to be used.

The inertial mass is preferably coupled to the spindle in a frictional and/or materially bonded and/or interlocked manner. The inertial mass or the supporting component can, for example, be press-fitted onto the spindle (interference fit), or can be frictionally fixed by clamping, for example, by means of a clamping screw. Alternatively, or in addition, the fixing can take place by adhesive bonding or welding, or by virtue of corresponding interlocking geometries.

The spindle can be displaced in the housing of the actuator along its longitudinal axis, so that it needs a bearing, or guiding in the housing. The spindle can be mounted indirectly relative to the housing, for example, by means of a bearing bush connected firmly to, preferably press-fitted onto the housing of the actuator.

In an advantageous design, the inertial mass connected to the spindle has an outer wall concentric with the longitudinal axis of the spindle. This outer wall is preferably cylindrical in order to form a bearing surface that co-operates with the inside of the bearing bush. If the inertial mass is produced by cold-forming, then a smooth cylindrical outer wall can be produced in a simple manner so that, overall, an inexpensively made component is obtained for the inertial mass.

In the case of an actuator for a steer-by-wire steering device, it is known from the prior art that a bearing sleeve, also known as a screw-on socket, is coupled to an end or to the ends of the spindle. To produce a compact combination of the bearing sleeve, the spindle and the inertial mass, in an advantageous design the inertial mass can be at least partially surrounded by the bearing sleeve or the bearing sleeve by the inertial mass. For that purpose, the components have cut-outs and shoulders so that these can be fitted together into one another with the spindle in a nested manner. Preferably the inertial mass is in the form of a rotationally symmetrical component and is therefore simple to produce, for example by machining or by cold-forming. In the description of the figures this structural design is illustrated in various versions.

For various actuators of different lengths, a spindle of the same length (an inexpensive interchangeable component) can be used. The sometimes-necessary adaptation of the length of the spindle to the length of the actuator can be achieved by means of bearing sleeves. The oscillation behavior can be adapted by inertial masses with different dimensions on the spindle drive or actuator concerned. If the inertial mass has an outer diameter equal to the outer diameter of the bearing sleeve, then the outer wall of the bearing sleeve in combination with the outer wall of the inertial mass can be used as a slide-bearing surface relative to the bearing bush. The outer wall of the inertial mass alone can also serve as a slide-bearing surface. If the outer diameter of the inertial mass is smaller or equal to the outer diameter of the bearing sleeve, then when the spindle is displaced axially there will be no interference with the bearing bush or the bearing point in the housing.

In a preferred embodiment the inertial mass is formed at least in part by a stud, a first function of which is to prevent rotation of the spindle relative to the housing of the actuator. In the aforesaid actuator an anti-rotation means is required so that when the spindle nut rotates, the spindle itself that meshes with it does not co-rotate with it about its longitudinal axis. To save structural space, the mass of the stud is advantageously taken into account when calculating the inertial mass. In other words, the stud can be part of the inertial mass or can by itself constitute the inertial mass. This produces a compact variant combining the functions of preventing rotation and constituting the inertial mass. The stud can be connected to the spindle indirectly or directly. In the case of direct connection, the stud is coupled directly to the spindle, preferably screwed to the spindle by a screw connection which is preferably orientated approximately or exactly transversely to the longitudinal axis of the spindle. Alternatively, the stud can be coupled to the spindle with the bearing sleeve or the inertial mass alone, or with the bearing bush or the inertial mass and the spindle as well. For the last-mentioned variant too, a screw connection transverse to the longitudinal axis of the spindle is preferably used. The stud can be screwed into the bearing sleeve or the inertial mass, and it can additionally serve to secure the spindle by friction force and/or interlock.

In a further preferred embodiment, the inertial mass serves as a connecting component between the spindle and the bearing sleeve. In this case the spindle is connected only secondarily, i.e. indirectly to the bearing sleeve. The spindle can be screwed to the inertial mass, or the inertial mass can even be injection-molded onto or around the spindle, or even welded thereto. The inertial mass can be connected to the bearing sleeve with interlock, or by friction force, or in a material-bonded manner. Preferably the bearing sleeve has an opening, for example a blind hole. Preferably the inertial mass has a diameter which is smaller than the inside diameter of the blind hole. The surrounding gap is then filled, preferably with an elastomer. This provides a degree of decoupling by virtue of the elastic connection between the inertial mass and the bearing sleeve.

According to a further aspect of the invention a method is provided for assembling an actuator of a steer-by-wire steering device as mentioned earlier. During assembly the inertial mass is coupled to the spindle in a number of steps. For example, in a first step the inertial mass is coupled to the spindle by a press-fit connection. This can be done for example by an interference fit or by shrinking on. If the inertial mass is made in at least two parts consisting of a supporting component and a mass component, the supporting component is coupled first to the spindle and in an at least indirectly following step the mass component is fitted onto the supporting component. Once the spindle and the supporting component have been assembled together, for example, the spindle nut can be fitted onto the spindle. Thus, nothing is in the way of later assembly with the housing. Namely, if the mass component or the inertial mass has an overall diameter which would make the actual assembly impossible because that diameter is too large, then the housing or other components of the actuator do not have to be adapted. The mass component can easily be fitted only after previous components have already been assembled.

A steer-by-wire steering device is a steering device which is decoupled from any mechanical link with a steering manipulator such as a steering-wheel. The steering movement of the driver by means of a steering manipulator is not transmitted to the wheel carriers or wheels by any purely mechanical means such as a linkage. Rather, a steering angle for the respective wheels of an axle is calculated, for example in a control unit, which then sends control signals to the actuator(s) of the steer-by-wire steering device and ultimately produces the change of the wheel steering angle.

BRIEF DESCRIPTION OF THE DRAWINGS

Below, the invention is described with reference to preferred embodiments illustrated in the drawing, which shows.

DETAILED DESCRIPTION

Figure 1:
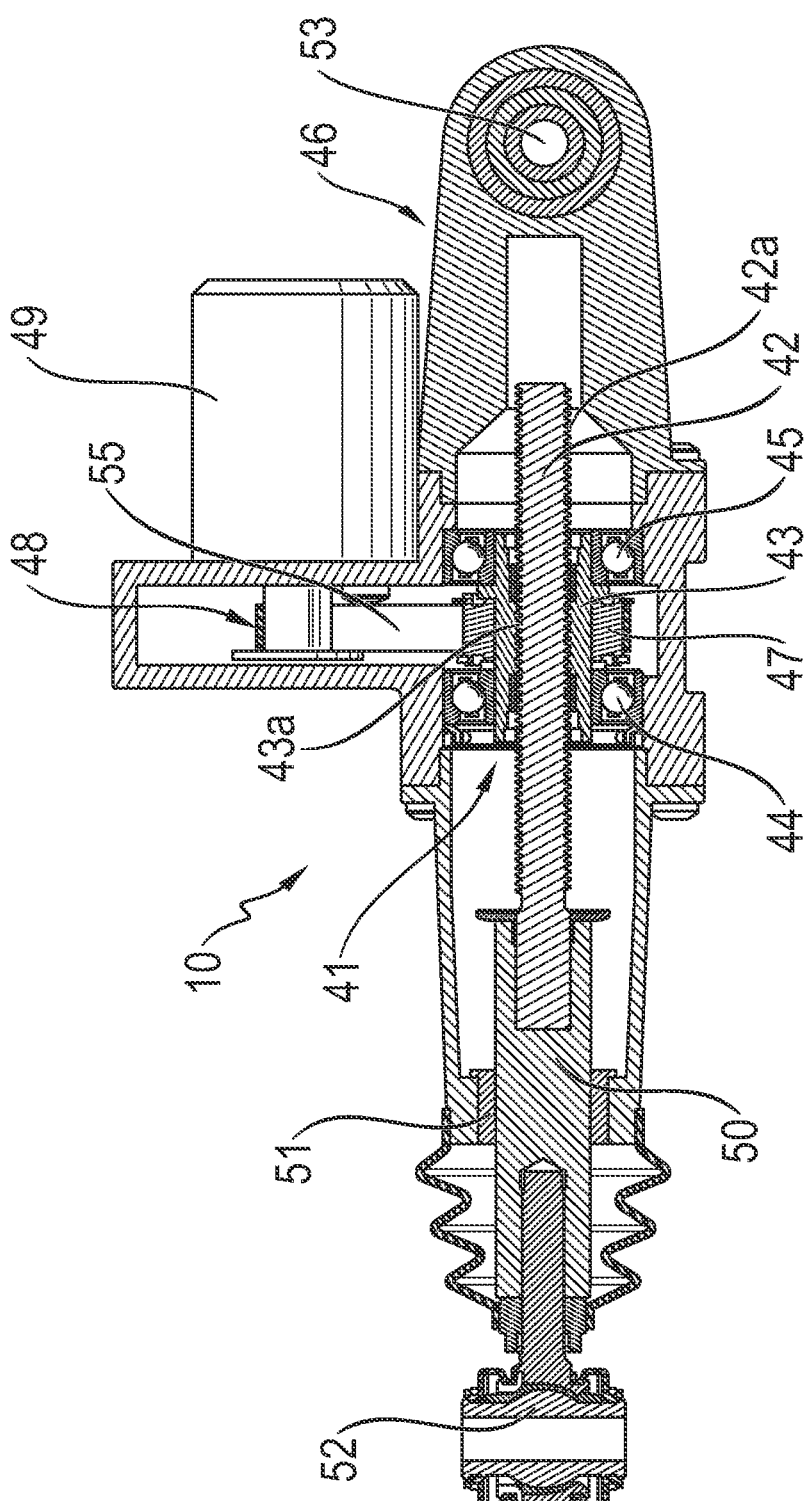
FIG. 1: An actuator according to the prior art.

FIG. 1 shows an actuator 10 for a steer-by-wire steering device, according to the known prior art. The actuator 10 is also called a servomotor and comprises a spindle drive 41, which consists of a spindle 42 having a spindle thread 42a and a spindle nut 43 having a nut thread 43a. The spindle nut 43 is mounted to rotate by virtue of roller bearings 44, 45 in a housing 46 and is axially fixed—in other words its location is fixed. The housing 46 is divided into housing components, namely a housing component 46a on the right, a housing component 46b on the left and a housing component 46c in the middle. A belt wheel 47 is arranged rotationally fixed on the spindle 42, which wheel can be driven via a belt drive 48 by an electric motor 49 by way of a belt 55. At one end the spindle 42 is connected to a bearing sleeve 50 in the form of a push-on or screw-on socket, which is guided on the housing side in a bearing bush in the form of a slide bearing or a thrust bearing 51. The bearing sleeve 50, part of which projects out of the housing component 46b, is connected to a joint sleeve 52 by which a steering linkage (not shown) is articulated to a wheel carrier. The housing component 46a on the right is supported by a joint 53 on the vehicle side or to the structure of the vehicle body.

The above arrangement can be used as a steer-by-wire steering device on a vehicle axle, preferably a rear-axle steering of a motor vehicle. The actuator 10 illustrated is designed as an individual actuator, i.e. it is for example arranged close to a wheel and supported on the vehicle body on one side in order to change a wheel steering angle of one wheel. At the other end the actuator is connected by way of the joint sleeve 52, via a steering linkage or directly, to a wheel carrier on which a wheel is fitted and able to rotate. The actuator 10 acts, for example, on a rear wheel and changes its wheel steering angle when the spindle 42 is displaced. Correspondingly, a further individual actuator is provided for the second rear wheel. The wheel steering angle is changed by means of the spindle 42, which can be displaced axially when the spindle nut 43 is driven, and the linear movement is transmitted to the joint sleeve 52 via the bearing sleeve 50. The spindle drive described can also be used with a dual or central actuator, i.e. an actuator that has a steering action upon both wheels of an axle.

In the rest of the figure descriptions the same components with the same functions are given the same indexes.

Figure 2:
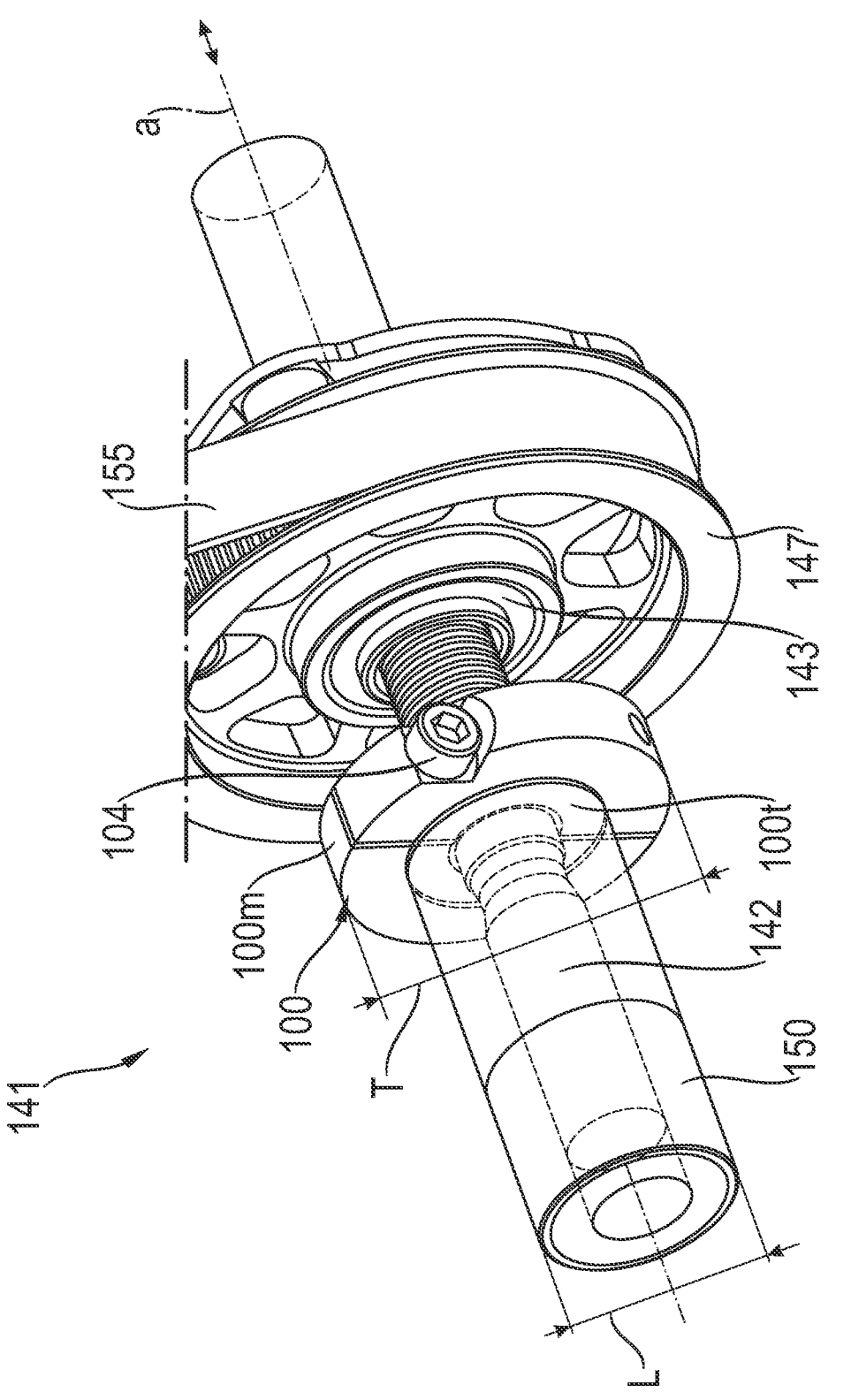
FIG. 2: A detailed view of the spindle drive of an actuator with an inertial mass

FIG. 2 shows a perspective view of a spindle drive of an actuator according to the invention, here depicted so as to show its parts. The spindle 142, together with the spindle nut 143, forms a movement thread. The spindle nut 143 is surrounded by the belt wheel 147, so that when the belt 155 is actuated the spindle nut 143 rotates. As indicated by the double arrow, the spindle 142 can thereby be moved axially in one direction or the other. At its left-hand end the spindle 142 is screwed onto a bearing sleeve 150. The bearing sleeve 150 extends as far as the inertial mass 100 and for that reason is shown partially by broken lines as transparent. The inertial mass 100 is made of two parts and consists of a supporting component 100*t* and a mass component 100*m*. The supporting component 100*t* is in the form of a screw ring and is held by friction onto the thread of the spindle 142. The mass component 100*m* is made of two half-rings clamped onto the supporting component 100*t* by screws 104. It can be seen that the outer diameter T of the mass component 100*m* is larger than the outer diameter L of the bearing sleeve 150. However, the outer diameter of the supporting component 100*t* is equal to the outer diameter L of the bearing sleeve 150. Thus, during the fitting of the spindle to the bearing sleeve 150 and the housing (not shown here) assembly is easy without the large outer diameter T of the mass component 100*m* being able to impede the process. The inertial mass can be designed in accordance with the application case, i.e. depending on the amount of damping or oscillation reduction desired. In a simple manner a mass component 100*m* with a larger diameter or a larger axial length can be used. In such cases the same supporting component 100*t* can be used for various configurations. This provides an inexpensive possibility for improving the oscillation behavior of the spindle or actuator in such manner that acoustically perceptible effects due to the spindle drive or the actuator as a whole are avoided.

Figure 3:
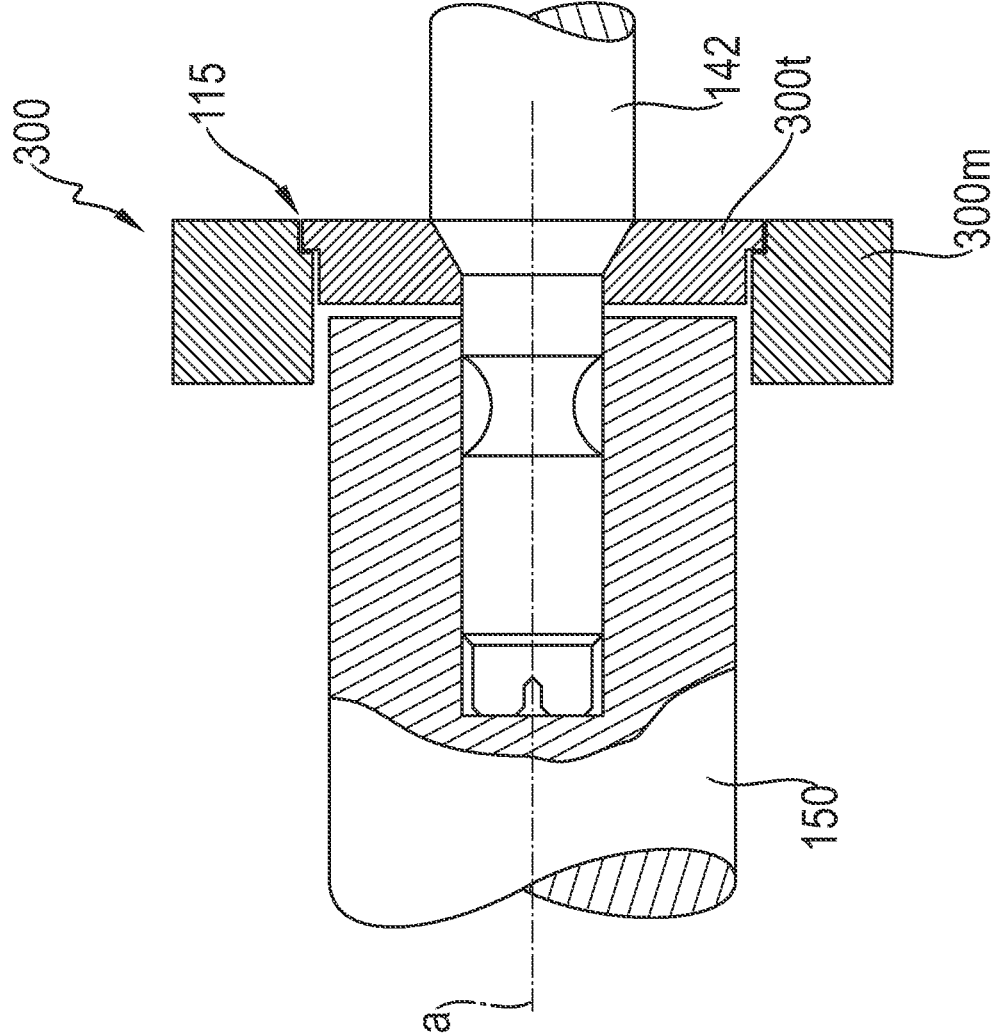
FIGS. 3 to 6: Further designs of spindle drives for an actuator with an inertial mass, shown in detail in each case.

FIG. 3 shows a partially sectioned detailed view of a spindle drive as in FIG. 2. This shows a further variant of an inertial mass 300, which also consists of a supporting component 300*t* in contact with the spindle 142 and a mass component 300*m* surrounding the supporting component 300*t*. The spindle 142 is coupled to the bearing sleeve 150 by screwing. It can be seen that the spindle 142 is first fitted to the supporting component 300*t*. In the next step the bearing sleeve 150 is screwed onto the end of the spindle 142. Further assembly steps can now follow in order to assemble the spindle drive or actuator. In a further assembly step, the mass component 300*m* can finally be joined to the supporting component 300*t*. In the variant shown in FIG. 3 the supporting component 300*t* and the mass component 300*m* have shoulders, steps or cut-outs or recesses 115 which enable simple, interlocking assembly. For example, the components can be joined to one another in a cohesive manner by adhesive bonding.

Figure 4:
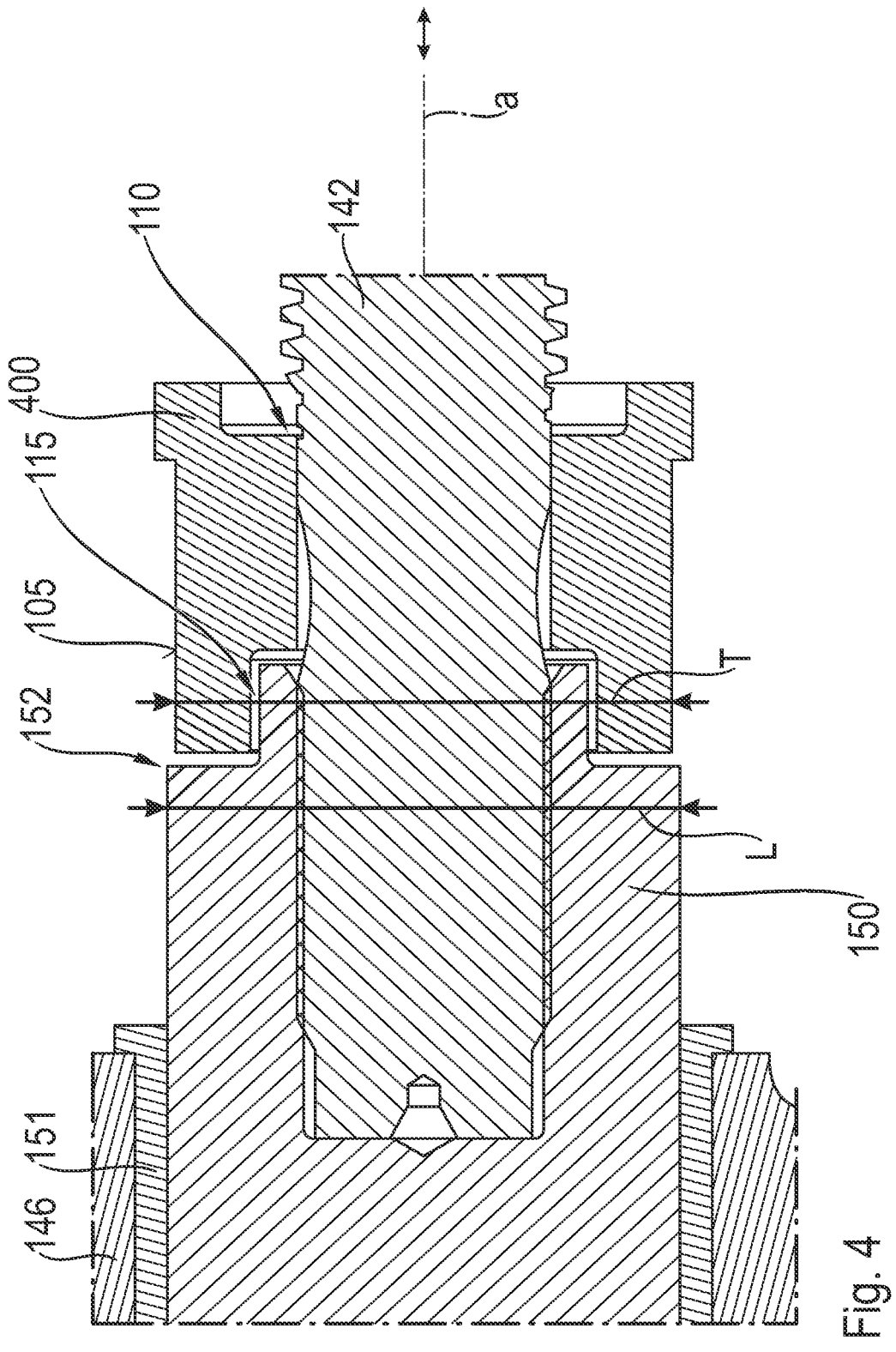
Figure 4A:
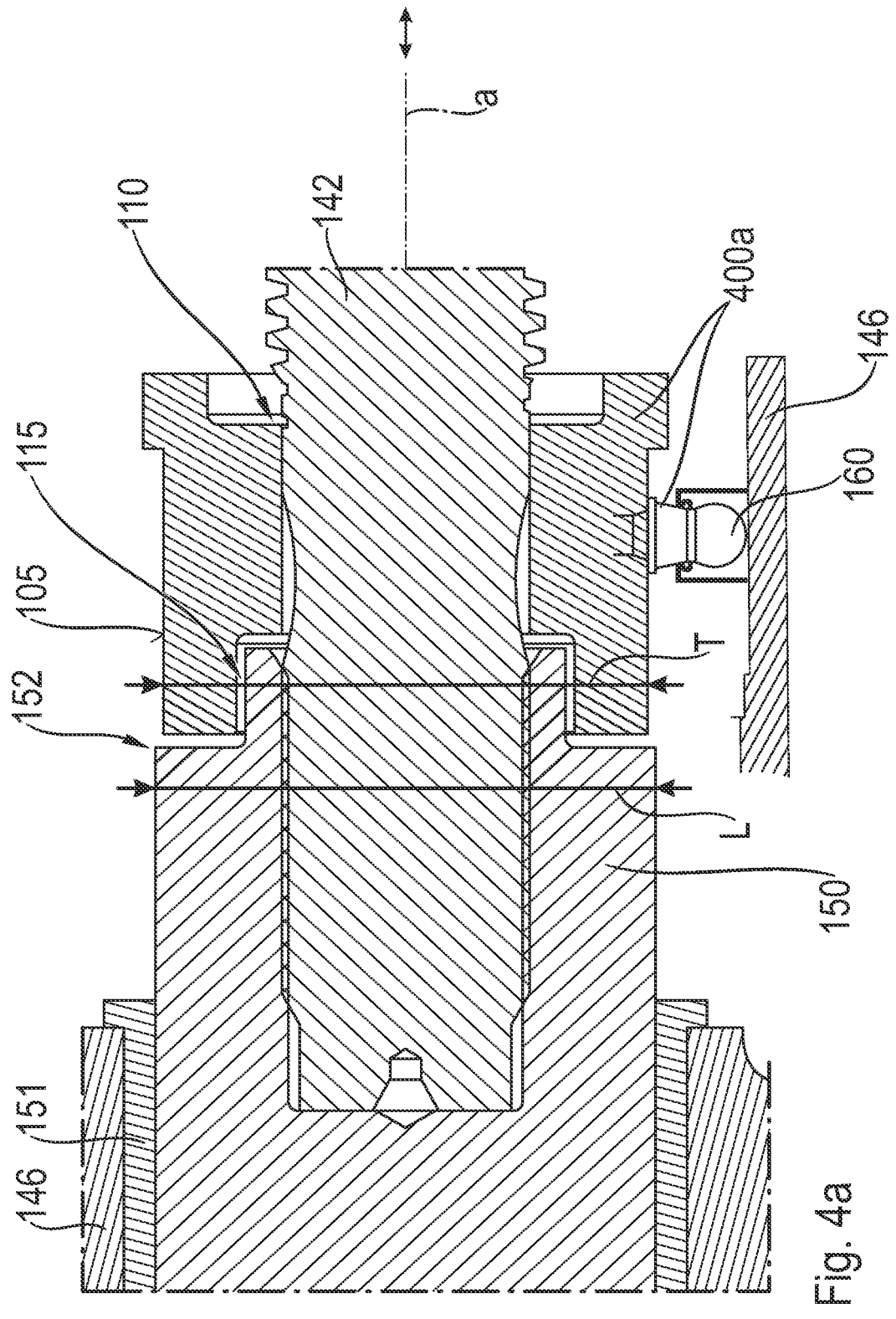

FIGS. 4 and 4a show a further spindle drive with an inertial mass 400, which in this case is joined to the spindle 142 by a press-fit connection 110. The inertial mass 400, 400a is made in one piece in FIG. 4 and in two pieces in FIG. 4a. In both versions the inertial mass 400, 400a has a cylindrical outer wall 105. In the variant (inertial mass 400a) according to FIG. 4a, a stud 160 is screwed into the outer wall 105 transversely to the longitudinal axis. The stud 160 is on the one hand an anti-rotation feature which is supported against the inside wall of the housing 146 and prevents the spindle 142 from co-rotating when the spindle nut (not shown here) is rotated. On the other hand, the stud is part of the inertial mass 105. At its end the spindle 142 is screwed to the bearing sleeve 150 and is mounted in and guided relative to the housing 146 by the bearing bush 151.

In both of the versions of FIGS. 4 and 4a the outer diameter T of the outer wall 105 of the inertial mass 400, 400a is slightly smaller compared with the outer diameter L of the bearing sleeve 150, so the outer wall 105 cannot serve as a bearing surface for the bearing bush 151. Furthermore, the inertial mass 400, 400a has a recess 115 at its end on the left. With this recess 115 the inertial mass 400, 400a surrounds the step 152 on the right-hand side of the bearing sleeve 150. It can be seen that by virtue of this nested variant, a configuration of the bearing sleeve 150 and the inertial mass 400 or 400a which is compact as regards the axial and radial extensions is obtained. In contrast to the variants according to FIG. 2 or 3, the desired mass of the inertial mass 400 or 400a can again be varied by a corresponding axial extension. Thus, the inertial mass can even be made with a relatively small diameter.

Figure 5:
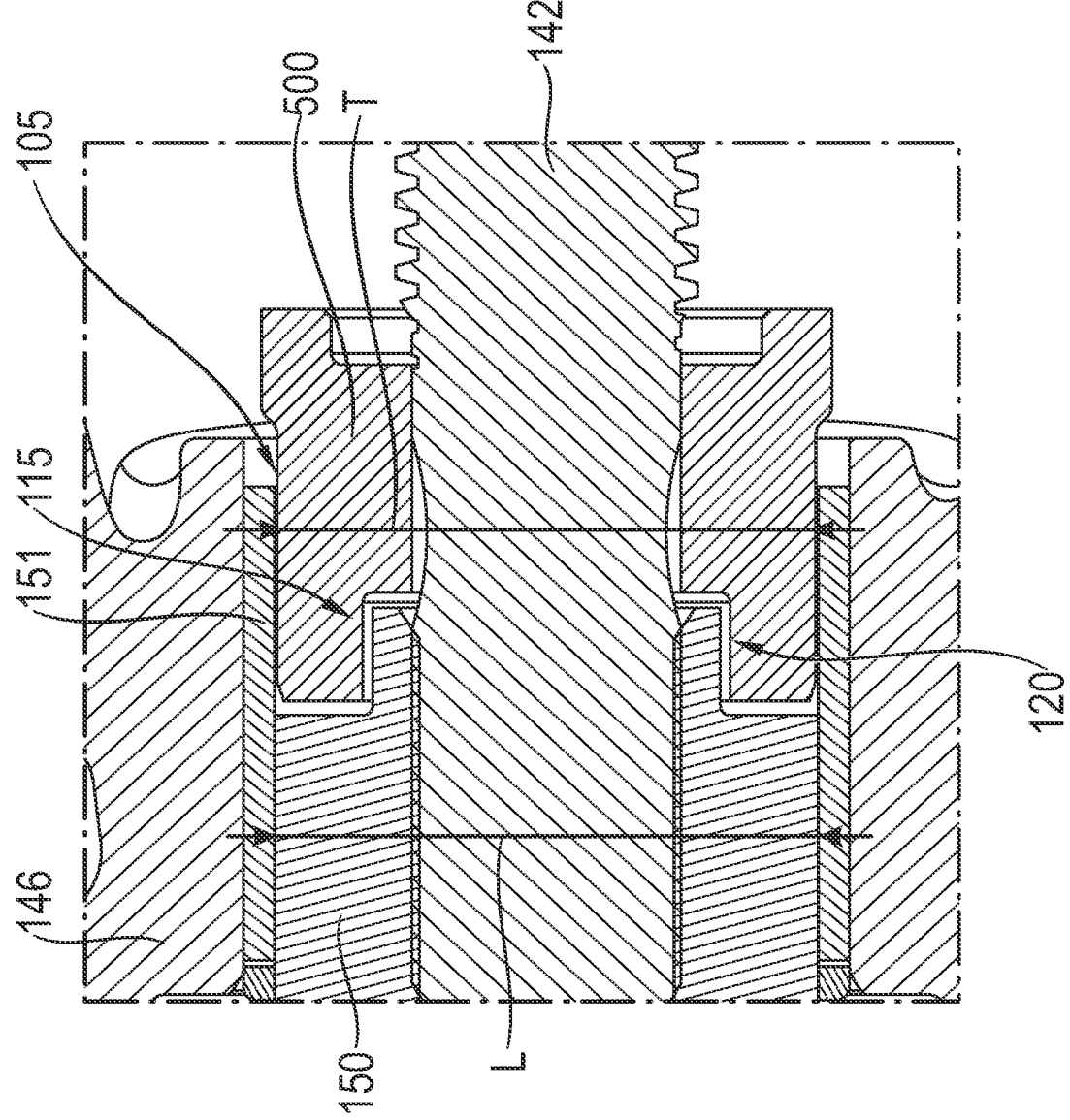

FIG. 5 shows a variant similar to FIG. 4 which has been adapted further to give a still more compact structure. The nesting of the one-piece inertial mass 500 and the bearing sleeve 150 is designed as in the variant according to FIG. 4. However, the outer diameters L and T are made equal. The outer wall 105 of the inertial mass 500 is a smooth cylinder, so that it at the same time forms a sliding surface in addition to the sliding surface on the outer wall of the bearing sleeve 150. Thus, the bearing sleeve can be made shorter and the slide-bearing surface required is still present, or indeed the slide-bearing surface can be made larger thanks to this arrangement.

Figure 6:
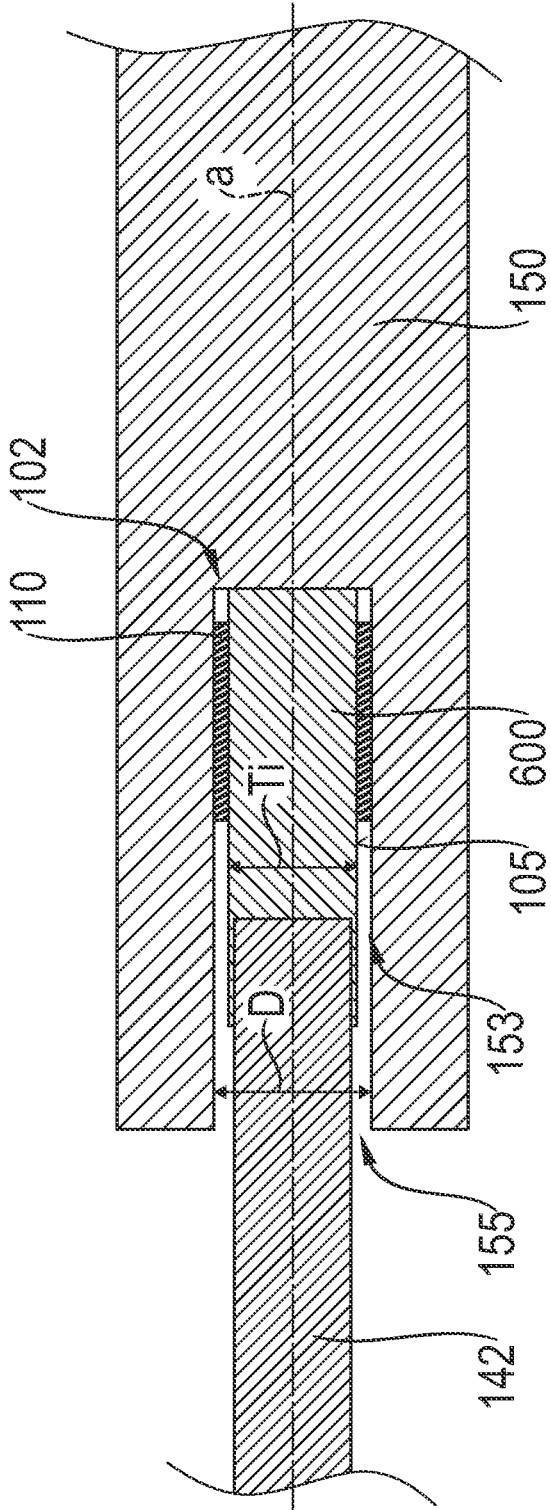

FIG. 6 shows a further example embodiment of a spindle 142 with an inertial mass 600, which again has a damping action on the spindle. The spindle 142 has a longitudinal axis a and is in part surrounded by an inertial mass 600 to which it is connected in a rotationally fixed manner. The spindle 142 is coupled directly to the bearing sleeve 150 by the inertial mass 600. The inertial mass 600 forms a connecting piece to the bearing sleeve 150. The bearing sleeve 150 holds the end of the spindle 142 and the inertial mass 600 is held in a blind hole or recess 155. The inertial mass 600 has an outer diameter Ti which is smaller than the inside diameter D of the bearing sleeve 150. Between the outer wall 105 of the inertial mass 600 and the inside wall 153 of the bearing sleeve 150 there is an all-round sleeve-like gap 102. Over part of the length of the inertial mass 600 an elastomer 110 with a damping action is provided, which connects the inertial mass 60 elastically with the bearing sleeve 150.

INDEXES

10 Actuator
41 Spindle drive, movement thread
42, 142 Spindle
42a Internal thread of the spindle nut
43, 143 Spindle nut
43a External thread of the spindle
44 Bearing
45 Bearing
46, 146 Housing
47, 147 Belt wheel 48 Belt drive
49 Electric motor
50, 150 Bearing sleeve
51, 151 Bearing bush
52 Joint sleeve
53 Bearing eye
55, 155 Belt
100 Inertial mass
100t, 300t Supporting component
100m, 300m Mass component
102 Gap
104 Screw
105 Outer wall
110 Press-fit connection
115 Recess
120 Ring
152 Step
153 Inside wall
160 Stud
300 Inertial mass
400 Inertial mass
400a Inertial mass
500 Inertial mass
600 Inertial mass
a Longitudinal axis
T Outer diameter
L Outer diameter
Ti Outer diameter
D Inside diameter

The invention claimed is:

1. An actuator of a steer-by-wire steering device of a motor vehicle, comprising:
    a housing;
    a spindle drive with a spindle and a positionally fixed spindle nut rotatably mounted within the housing (46, 146) for the axial displacement of the spindle relative to the spindle nut; and
    an inertial mass fixedly coupled to the spindle at least indirectly, the inertial mass having a mass moment of inertia configured to at least dampen or prevent oscillation behavior of at least one component of the actuator.

2. The actuator according to claim 1, wherein the mass moment of inertia is a function of oscillation behavior of the spindle.

3. The actuator according to claim 1, wherein the inertial mass comprises a plurality of parts.

4. The actuator according to claim 3, wherein the inertial mass is coupled to the spindle by friction and/or in a material-bonded manner and/or in an interlocking manner.

5. The actuator according to claim 1, wherein the inertial mass has a cylindrical outer wall concentric with a longitudinal axis of the spindle, the cylindrical outer wall defining a bearing surface which co-operates at least indirectly with the housing and/or with a bearing bush.

6. The actuator according to claim 1, wherein when the spindle is coupled to a bearing sleeve, and wherein the inertial mass is at least partially surrounded by the bearing sleeve or the bearing sleeve is at least partially surrounded by the inertial mass.

7. The actuator according to claim 6, wherein an outer diameter of the inertial mass is smaller than or equal to an outer diameter of the bearing sleeve.

8. The actuator according to claim 1, wherein the inertial mass is formed at least in part by comprises a stud, which also serves configured and arranged to prevent the spindle from rotating relative to the housing.

9. The actuator according to claim 1, wherein the inertial mass is configured as a connecting component between the spindle and the bearing sleeve.

10. A method for assembling the actuator of claim 1, comprising coupling the inertial mass to the spindle in a plurality of steps.

11. The method of claim 10, wherein the plurality of steps includes a first step of coupling the inertial mass to the spindle using a screw connection.

12. The method of claim 10, wherein the plurality of steps includes a first step of coupling the inertial mass to the spindle using a press-fit connection.

13. The method according to claim 10, comprising:

making the inertial mass in at least two parts consisting of a supporting component and at least one mass component;

coupling the supporting component to the spindle; and fitting, subsequently, the at least one mass component onto the supporting component.

* * * * *